United States Patent

Budecker et al.

[11] 3,886,848
[45] June 3, 1975

[54] PRESSURE OPERATED DIRECTIONAL CONTROL VALVE

[75] Inventors: Ludwig Budecker, Frankfurt, Main; Hubertus Von Grunberg, Niederhochstadt, both of Germany

[73] Assignee: ITT Industries, Inc., New York, N.Y.

[22] Filed: Apr. 3, 1974

[21] Appl. No.: 457,444

[30] Foreign Application Priority Data
May 12, 1974 Germany.................... 2324059

[52] U.S. Cl. .................. 91/412; 60/413; 60/418; 60/484
[51] Int. Cl. .......................................... F15b 11/16
[58] Field of Search ............ 60/413, 418, 422, 484; 91/412

[56] References Cited
UNITED STATES PATENTS

| | | | |
|---|---|---|---|
| 2,559,065 | 7/1951 | Dewandre | 91/412 X |
| 2,818,711 | 1/1958 | Lincoln et al. | 60/418 X |
| 2,846,850 | 8/1958 | Hall | 91/412 X |

*Primary Examiner*—Edgar W. Geoghegan
*Attorney, Agent, or Firm*—A. Donald Stolzy

[57] ABSTRACT

A valve that permits a hydraulic or other fluid to be fed to two utilization devices by means of a pump. Priority is given to one device. The control is advantageously effected directly by the pressure of an accumulator, when it is the one of the devices which is given priority. Resilient means having a negative force or snap acting characteristic provides a rapid control.

28 Claims, 4 Drawing Figures

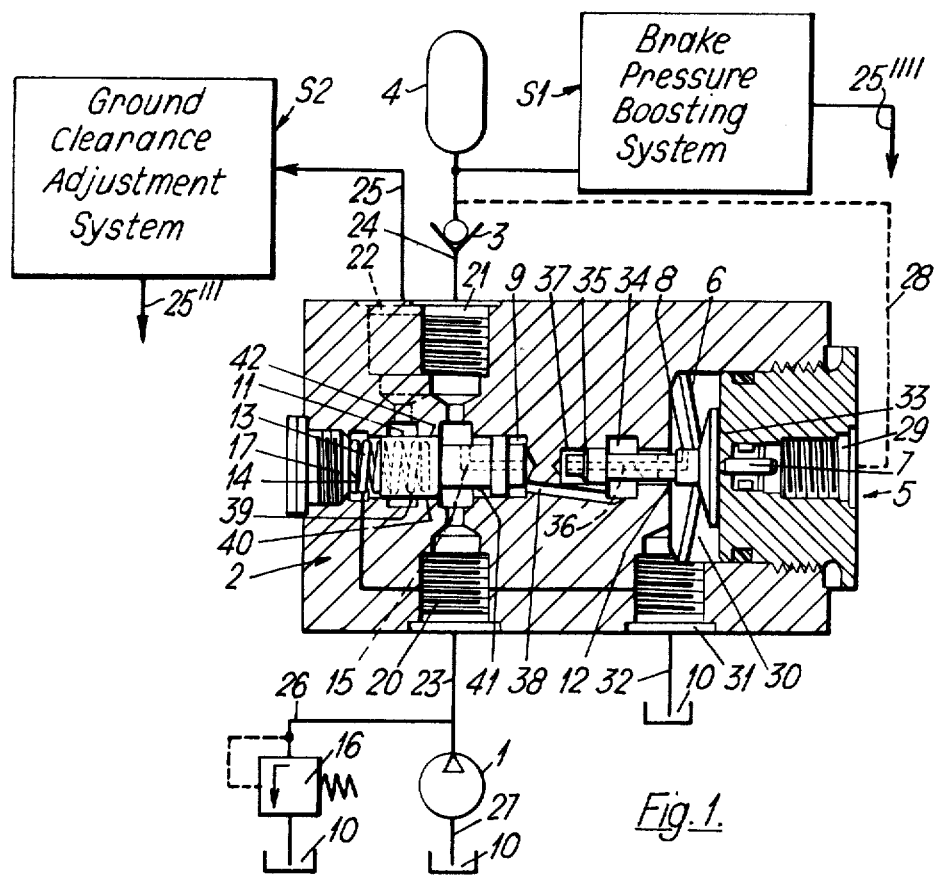
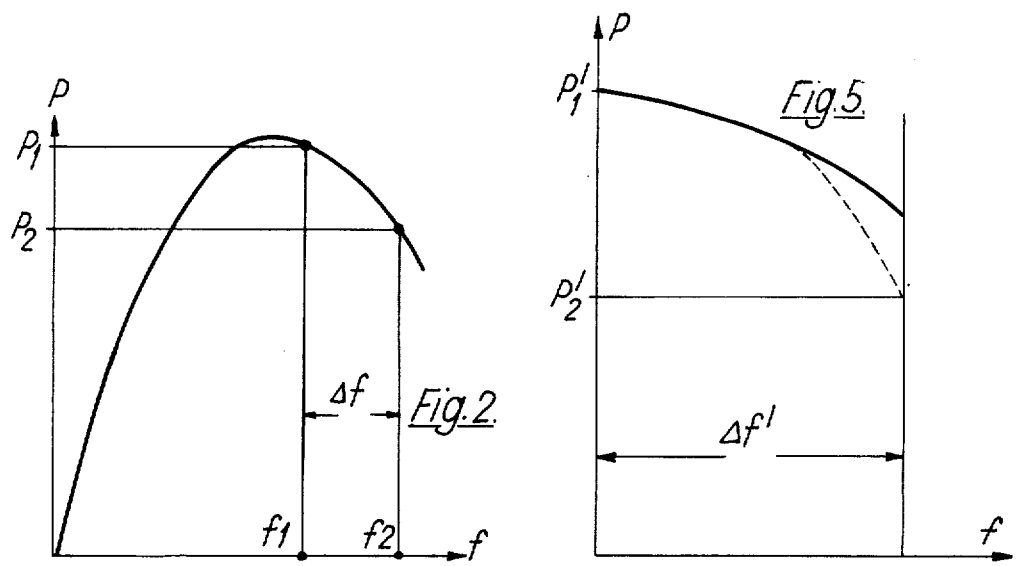

3,886,848

PRESSURE OPERATED DIRECTIONAL CONTROL VALVE

BACKGROUND OF THE INVENTION

This invention relates to fluid operated valves, and more particularly, to a pressure operated directional control valve for controlling the flow of a fluid delivered by a pump to an accumulator hydraulic system and another system wherein the other system requires less pressure than the accumulator hydraulic system, the accumulator hydraulic system permanently communicating with the pump via a check valve inhibiting flow in the direction of the pump.

It is necessary, for instance in motor vehicles having a system of adjusting ground clearance or for power steering and, in addition, an accumulator hydraulic system for brake pressure boosting, to supply, primarily, the accumulator hydraulic system with fluid under all circumstances. This means that the accumulator must be recharged immediately when the pressure therein drops below a predetermined minimum so as to maintain the brake operative at any time. While the accumulator is being charged, the supply to, for example, the ground clearance system (GCS) may be interrupted without involving any danger for the vehicle.

A valve is known from the German Specification DT-AS 2,003,554 which causes the discharge of a pump to be split up and to be fed to the other system on the one hand, and to an accumulator hydraulic system on the other hand. In this valve, portions of the discharge are provided which have a predetermined ratio. One portion is supplied to the other system.

The other portion is supplied to the accumulator hydraulic system when so required; otherwise, it is discharged into the return. Both systems have to be supplied with fluid simultaneously, delivery of the pump must, thus, be designed to be correspondingly large. However, sometimes the accumulator hydraulic system is operated infrequently and, therefore, requires but small amounts of fluid. The discharge allocated to it is then fed to the return reservoir. This results in very high power losses and in an extremely low efficiency. Further, the large size required makes the pump rather expensive.

It is also possible to supply fluid to the desired system via an electromagnetic 3/2 directional control valve which is controllable by a pressure switch. However, in pressure controlled hydraulic systems, this is complicated and consequently too costly to connect hydraulic paths by means of electrical energy. In addition, this arrangement is troublesome.

It is the object of the present invention to provide a directional control valve controllable by the accumulator pressure, through which valve the whole discharge of the pump is fed to either the other system or the accumulator hydraulic system, with the supply of fluid to the accumulator hydraulic system being assigned priority.

SUMMARY OF THE INVENTION

According to the present invention, the said object is achieved by providing a connection between the pump and the other system which can be closed by means of a shut-off element, with the latter being biased in closing direction by resilient means, a chamber which is located behind a pressure-applied surface of the shut-off element and communicates, via a fluid connection of small cross section, with a port of the pump against the closing direction, and wherein the said chamber is connectible in turn with the return line via a pilot valve in dependence on the accumulator pressure.

A further advantageous embodiment of this invention comprises, in the valve slide, a further fluid connection between the chamber behind the pressure-applied surface of the shut-off element and the return line, which connection can be opened in dependence on the pressure prevailing in the said chamber.

The valve element of the pilot valve may also be applied in a closing direction by accumulator pressure and biased against the closing direction by resilient means having a negative characteristic. This permits the power output of the resilient means to be even increased by virtue of the fluid flow.

The advantages achieved with this invention include the use of the inventive directional control valve to permit two independent hydraulic systems to be supplied by fluid by one pump, wherein the capacity of the pump need be designed for only one system. This has the advantage that a relatively small and, therefore, inexpensive pump may be employed. In addition to this, the directional control valve constructed in accordance with this invention permits priority to be given to the more important hydraulic system as regards the supply of fluid. This practically excludes the possibility of failure of the hydraulic system because of a lack of fluid or pressure. The invention is, thus, fail safe. If the accumulator hydraulic system does not require fluid, the entire discharge flow is directed to the other system. This, therefore, avoids losses occasioned by returning part of the discharge to the reservoir. Further, only when fluid is required for the accumulator hydraulic system does the pump have to deliver fluid against the higher pressure required in this system. The valve is a quick-acting valve. The accumulator system is, thus, supplied with fluid immediately when that is required.

The above-described and other advantages of the present invention will be better understood from the following detailed description when considered in connection with the accompanying drawings.

BRIEF DESCRIPTION OF THE DRAWINGS

In the drawings which are to be regarded as merely illustrative:

FIG. 1 is a longitudinal sectional view of one embodiment of the direction control valve constructed in accordance with the invention;

FIG. 2 is a curve characteristic of the operation of resilient means of a pilot valve;

FIG. 5 is a curve characteristic of the operation of resilient means within the work area of a pilot valve.

DESCRIPTION OF THE PREFERRED EMBODIMENTS

Figure 3:
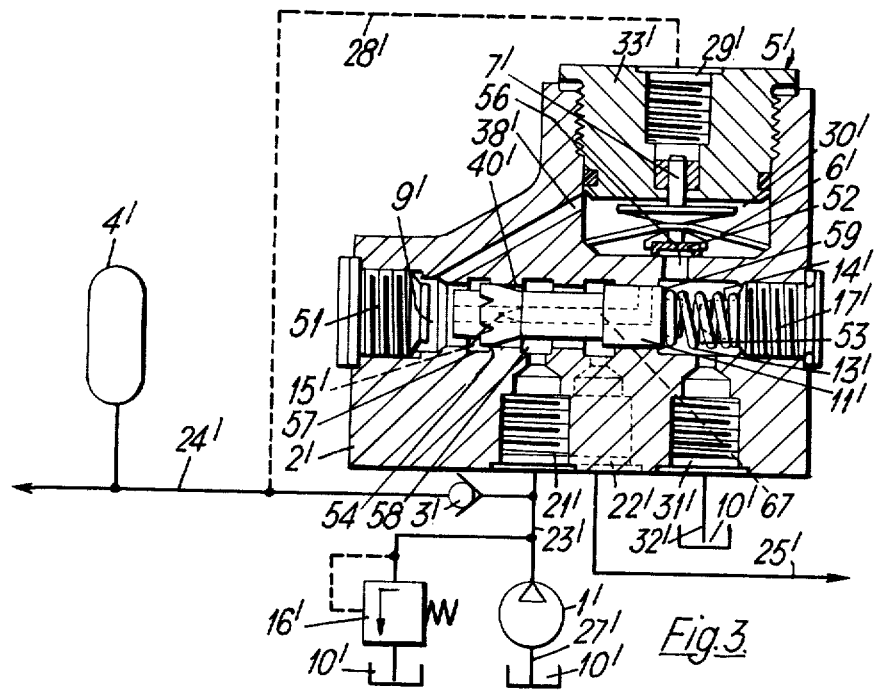
FIG. 3 is a longitudinal sectional view of another embodiment of the directional control valve constructed in accordance with the invention.

In FIG. 1, a pump 1 is illustrated. Pump 1 communicates via a line 27 with a reservoir 10 on the one hand, and via a line 23 with a port 20 of a directional control valve 2 constructed in accordance with the invention on the other hand. A line 26 connects line 23 with the reservoir 10 via a pressure-relief valve 16. A line 24 connects a port 21 of the directional control valve 2 with an accumulator 4 of an accumulator hydraulic system or brake pressure-boosting system S1 via a check valve 3 blocking in the direction of the directional control valve 2. A port 22 of the directional control valve 2 communicates with a line 25 leading to the other system, i.e., a ground clearance adjustment system S2—hereinafter called a circulation system. A line 28 connects the section of line 24 situated between the check valve 3 and the accumulator 4 with a port 29 of a pilot valve 5.

Systems S1 and S2 may or may not dump into reservoir 10 via outlets 25'''' and 25''', respectively, as desired.

A chamber 30 in the pilot valve 5 is connected with the reservoir 10 via a port 31 and a line 32. A piston 7, one end of which is subject to control pressure from the port 29, rests with its other end against a valve slide 8 in chamber 30, said piston being tightly guided but axially slidable through a member 33 of the pilot valve 5. Said valve slide 8 is biased toward member 33 by a cup or Belleville spring 6 provided in chamber 30, and is guided in a bore 35. An annular chamber 34 communicates with chamber 30 via a leading edge 12. A chamber 37 in front of an end surface of the valve slide 8 is connected with chamber 30 via a channel 36.

Via a channel 38, chamber 34 connects with a chamber 9 in front of an end surface of a shut-off element 11 which is biased towards chamber 9 by a spring 13 supporting itself in a recess 39 of the shut-off element 11 on the one hand, and resting against a closing member 17 on the other hand. The shut-off element 11 closes, by means of a sealing surface 40, the fluid connection towards port 22. An annular groove 41 of the shut-off element 11 permanently communicates with port 20. A narrow fluid connection 15 connects the annular groove 41 with chamber 9. The shut-off element 11 is slidably arranged in a bore 42. Displacement of the shut-off element 11 is limited by a stop 14 provided at the closing member 17.

OPERATION OF THE EMBODIMENT OF FIG. 1

In the operation of the present invention, pump 1 draws fluid from the reservoir 10 through line 27, feeding it to port 20 of the directional control valve 2 via line 23. If the pressure level in accumulator 4 is below the lower switch point, the shut-off element 11 is in the illustrated position. Through port 21 and line 24, the pump feeds fluid to the accumulator 4 via the check valve 3. Thus, charging of the accumulator 4 causes the pressure therein to increase up to the upper switch point. This pressure is transferred to port 29 via line 28 where it is applied to the piston 7. Piston 7 then shifts the valve slide 8 in closing direction against the force of the cup spring 6. This happens very abruptly because of the negative spring characteristic. Displacement of the valve slide 8 causes the connection between chamber 34 and chamber 30 at the leading edge 12 to be interrupted.

The fluid supplied via the connection 15 is no longer allowed to escape into chamber 30 via channel 38 and the annular chamber 34. Thus, pressure is built up in chamber 9 and is applied to the end surface of the shut-off element 11 shifting the latter up to the stop 14 in the direction of the closing member 17 against the force of spring 13. This opens the connection between ports 20 and 22 permitting the pump to discharge into the circulation system. The higher pressure in the accumulator causes the check valve 3 to close, thus preventing fluid from flowing back therethrough.

If, due to fluid consumption, the accumulator pressure drops as far as to the lower switch point, the cup spring 6 overcomes the force applied to piston 7 and again shifts the valve slide 8 into the illustrated position. This re-opens the connection between chambers 34 and 30. The pressure prevailing in chamber 9 is now allowed to discharge into the reservoir via channel 38, chambers 34 and 30, port 31 and line 32, thereby again displacing the shut-off element 11 into the illustrated position by virtue of the force of spring 13. The connection between ports 20 and 22 is, thus, interrupted again and the pump can exclusively feed the accumulator 4.

FIG. 2 is a curve characteristic of the operation of cup spring 6. In this drawing, the P axis is the control pressure axis, i.e., the axis of the control pressure in bars acting on piston 7. It is proportional to the spring force. The $f$ axis is the axis of the deflection by which the spring is compressed in dependence on the said pressure. There have been entered for the chosen case the switch point $P_1 = 200$ bars, and $P_2 = 150$ bars, together with the associated spring deflections $f_1$ and $f_2$. From this is obtained the working stroke $\Delta f$ required for the pilot valve.

FIG. 3 shows a further embodiment of the directional control valve constructed in accordance with the invention. The reservoir 10' communicates with a pump 1' via a line 27'. Pump 1' connects with a port 21' via a line 23'. A line 24' connects an accumulator 4' with a line 23' via a check valve 3'. A port 22' communicates via a line 25' with the circulation system. A shut-off element 11' is movably guided in a bore 42' and biased in closing direction by a spring 13' resting against the shut-off element 11' on the one hand, and against the closing member 17' on the other hand. The effective cross-section of the fluid connection 15' between a chamber 58 and a chamber 57, which connection consists of notches provided on the periphery of the shut-off element 11', depends on the position of the shut-off element 11' relative to a leading edge 54. Chamber 57 communicates with a chamber 9'. A passageway 38' connects chamber 9' with a chamber 30'.

A control line 28' connects line 24' with a port 29' of a pilot valve 5'. A piston 7' of the pilot valve 5' is subject to accumulator pressure on the one hand, and is supported on the other hand by a valve member 52 which is biased towards a member 33' by a cup spring 6'. The valve member 52 of the pilot valve 5' is designed as a set valve closing a fluid passageway 56 connecting chamber 30' with a chamber 53 in which is located a spring 13'. Chamber 53, in turn, connects with the reservoir 10' via a port 31' and a line 32'.

A channel 67 connects chamber 9' with chamber 53 when the shut-off element 11' is in a determined position.

OPERATION OF THE EMBODIMENT OF FIG. 3

In the position illustrated, the shut-off element 11' connects the ports 21' and 22', thereby feeding fluid into the circulation system for pump 1'. If the accumulator pressure drops below the lower switch point, the cup spring 6' displaces the valve member 52 and the piston 7', thus opening the passageway 56 between chambers 30' and 53. This permits the pressure prevailing in chamber 9' to be reduced via channel 38', chamber 30', passageway 56, chamber 53, port 31' and line 32', toward the reservoir. Spring 13' then displaces the shut-off element 11' toward plug 51, thus interrupting the connection with port 22'. This allows pump 1' to feed fluid to accumulator 4' via line 23', the check valve 3' and line 24'. When the accumulator pressure has increased up to the upper switch point, piston 7' shifts the valve member 52 against the force of cup spring 6', thus closing the passageway 56. This prevents the fluid flowing into chamber 9' through connection 15' from being discharged into the reservoir. Pressure is, thus, built up in chamber 9' displacing the shut-off element 11' in the direction of plug 17' and the passage to port 22' is thereby opened. If by virtue of the pressure increase in chamber 9', the shut-off element 11' is shifted farther to the right against the force of spring 13', passageway 67 towards chamber 53 will be opened at a leading edge 59 when the pressure has reached a predetermined maximum. The pressure in chamber 9' is thereby limited to a maximum value in dependence upon the hardness of spring 13'.

Figure 4:
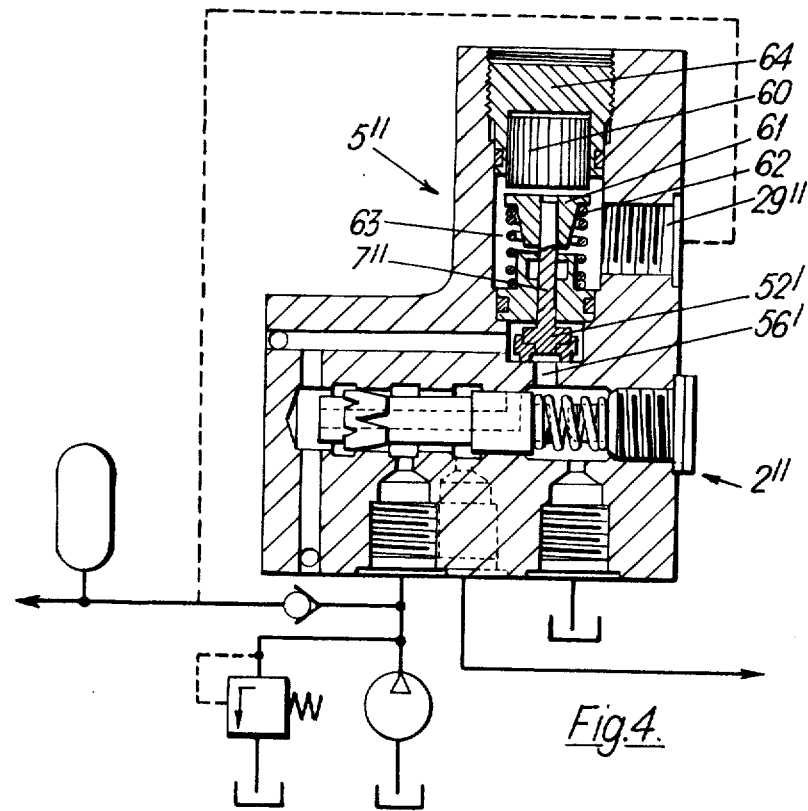
FIG. 4 is a longitudinal sectional view of still another embodiment of the directional control valve constructed in accordance with the invention.

Referring to the embodiment of FIG. 4, design and mode of operation of the directional control valve are identical to that of the embodiment of FIG. 3, the only exception being the pilot valve in which the cup spring is replaced by a pressure spring 62 and by a permanent magnet 60.

A piston 7'' of a pilot valve 5'' is shown in FIG. 4 fastened to a member 61 movably arranged in a chamber 63. Member 61 is biased against the closing direction of a valve member 52' by a pressure spring one end of which rests against member 61 and the other end against the housing of the pilot valve. A permanent magnet 60 mounted in an element 64, which is screwed in the housing of the pilot valve 5'', attracts member 61 against the closing direction of valve member 52', thus supporting the effect of spring 62.

The combination of a pressure spring 62 and a permanent magnet 60 again causes a negative characteristic to be obtained which permits rapid switching of the pilot valve and consequently also of the directional control valve.

Referring now to FIG. 5, the diagram shows the portion of the negative characteristic of the resilient means during the power stroke of the pilot valve.

If the connection to return, e.g. in FIG. 3 the passageway 56, directly communicates with the pump vacuum chamber, the force acting on the closing member via the resilient means is controlled by the pump vacuum according to the broken line in FIG. 5. This is advantageous in that the upper switch point $P_1'$ and the lower switch point $P_2'$ are spaced apart by an amount larger than that which would be possible using the resilient means alone.

In all embodiments, the pumps 1, 1', etc., are secured against excessive pressure by pressure-relief valves 16, 16', etc., respectively.

The word "fluid" is hereby defined for use herein and for use in the claims to mean "hydraulic fluid" or "all operative fluids including gases, if operative."

The phrase "means connecting" is hereby defined for use herein and for use in the claims to means a conduit, a valve or otherwise.

What is claimed is:

1. An apparatus including first and second utilization systems each having an inlet and requiring higher and lower predetermined pressures to operate the same, respectively, a fluid pressure accumulator having a port in communication with said first system inlet, a check valve having an inlet, and an outlet, said check valve outlet being in communication with said accumulator port and said first system inlet, said check valve being adapted to close when the accumulator pressure is above that in said check valve inlet, a pump having an inlet and an outlet, and third means connecting said pump outlet to said check valve inlet, said third means comprising: a valve body having first and second inlets, and first and second outlets, said first and second inlets being connected to said pump outlet and said check valve outlet, respectively, said first and second outlets being connected to said check valve inlet and said second system inlet, respectively; a main valve mounted in said body in a manner movable from a first position to a second position different from said first position, and vice versa, said main valve providing communication between said first inlet and said second outlet when located in said first position thereof, said main valve closing off communication between said first inlet and said second outlet when located in said second position thereof, resilient means mounted in said body in a position biasing said main valve to said second position thereof, said main valve having a surface, said main valve being movable in a predetermined direction opposite the direction in which at least a component of force is applied thereto by said resilient means, said body defining a chamber with said surface, said main valve being movable in said predetermined direction by a fluid under pressure in said chamber; conduit means forming a restriction connecting said chamber with said first inlet; a pilot valve mounted in said body and being actuable to open and to closed positions when the accumulator pressure is at lower and higher different predetermined pressure, respectively; operator means mounted in said second inlet to actuate said pilot valve, said body having a first path therethrough providing free and open communication from said chamber to one side of and through to the other side of said pilot valve, said body having a vent port, said body also having a second path therethrough providing free and open communication from said pilot valve one side to said vent port.

2. The invention as defined in claim 1, wherein said main valve includes a valve slide.

3. The invention as defined in claim 1, wherein said conduit means is located within said main valve.

4. The invention as defined in claim 1, wherein said operator means includes snap-acting, spring-like means to bias said pilot valve toward its open position, said spring-like means changing position rapidly at said higher and lower accumulator pressures.

5. The invention as defined in claim 4, including a reservoir connected with the inlet of said pump and said vent port.

6. The invention as defined in claim 4, wherein said spring-like means includes a snap-acting Belleville spring.

7. The invention as defined in claim 6, including a reservoir connected with the inlet of said pump and said vent port.

8. The invention as defined in claim 4, wherein said spring-like means includes a helical spring and a permanent magnet to provide snap action.

9. The invention as defined in claim 8, including a reservoir connected with the inlet of said pump and said vent port.

10. The invention as defined in claim 1, including a reservoir connected with the inlet of said pump and said vent port, said pilot valve having a port opening, said first and second paths having interior cross sections and said pilot valve having an opening cross section, all of which are large in comparison to the interior cross section of said conduit means, said check valve outlet being connected to said second inlet.

11. The invention as defined in claim 10, wherein said pilot valve includes spring-like means biasing it toward its open position.

12. The invention as defined in claim 11, wherein said spring-like means is snap acting and changes position rapidly at the higher and lower pressures of said accumulator.

13. The invention as defined in claim 12, wherein said conduit means is located within said main valve.

14. The invention as defined in claim 1, including a reservoir connected with the inlet of said pump and said vent port.

15. The invention as defined in claim 1, wherein said pilot valve has a port opening, said first and second paths having interior cross sections and said pilot valve having an opening cross section, all of which are large in comparison to the interior cross section of said conduit means, said check valve outlet being connected to said second inlet.

16. The invention as defined in claim 1, wherein said pilot valve includes spring-like means biasing it toward its open position.

17. The invention as defined in claim 16, wherein said spring-like means is snap acting and changes position rapidly at the higher and lower pressures of said accumulator.

18. The invention as defined in claim 1, wherein said conduit means is located within said main valve.

19. The invention as defined in claim 14, wherein said pilot valve has a port opening, said first and second paths having interior cross sections and said pilot valve having an opening cross section, all of which are large in comparison to the interior cross section of said conduit means, said check valve outlet being connected to said second inlet.

20. The invention as defined in claim 19, wherein said pilot valve includes spring-like means biasing it toward its open position.

21. The invention as defined in claim 20, wherein said spring-like means is snap acting and changes position rapidly at the higher and lower pressure of said accumulator.

22. The invention as defined in claim 21, wherein said conduit means is located within said main valve.

23. The invention as defined in claim 19, wherein said conduit means is located within said main valve.

24. The invention as defined in claim 23, wherein said pilot valve includes spring-like means biasing it toward its open position.

25. The invention as defined in claim 14, wherein said pilot valve includes spring-like means biasing it toward its open position.

26. The invention as defined in claim 25, wherein said spring-like means is snap acting and changes position rapidly at the higher and lower pressure of said accumulator.

27. The invention as defined in claim 26, wherein said conduit means is located within said main valve.

28. The invention as defined in claim 25, wherein said conduit means is located within said main valve.

* * * * *